United States Patent
Ma et al.

(10) Patent No.: US 12,272,076 B2
(45) Date of Patent: Apr. 8, 2025

(54) IMAGE PROCESSING METHOD, ELECTRONIC DEVICE AND STORAGE MEDIUM

(71) Applicant: GUANGDONG OPPO MOBILE TELECOMMUNICATIONS CORP., LTD., Dongguan (CN)

(72) Inventors: Yuanjiao Ma, Yokohama (JP); Jun Luo, Yokohama (JP); Wei Quan, Yokohama (JP)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 349 days.

(21) Appl. No.: 17/896,903

(22) Filed: Aug. 26, 2022

(65) Prior Publication Data
US 2022/0414896 A1    Dec. 29, 2022

Related U.S. Application Data

(63) Continuation of application No. PCT/CN2020/077036, filed on Feb. 27, 2020.

(51) Int. Cl.
G06T 7/207    (2017.01)
G06T 7/11     (2017.01)
G06V 10/80    (2022.01)

(52) U.S. Cl.
CPC ............... G06T 7/207 (2017.01); G06T 7/11 (2017.01); G06V 10/806 (2022.01)

(58) Field of Classification Search
None
See application file for complete search history.

(56) References Cited

U.S. PATENT DOCUMENTS

| | | | |
|---|---|---|---|
| 2003/0035594 A1* | 2/2003 | Kondo | G06T 5/70 |
| | | | 348/E5.065 |
| 2007/0030522 A1 | 2/2007 | Sasaki et al. | |
| 2016/0107595 A1 | 4/2016 | Rosenbaum et al. | |

FOREIGN PATENT DOCUMENTS

| CN | 102201113 A | 9/2011 |
|---|---|---|
| CN | 103065326 A | 4/2013 |

(Continued)

OTHER PUBLICATIONS

Joint Large-Scale Motion Estimation and Image Reconstruction. Dirks. (Year: 2016).*

(Continued)

*Primary Examiner* — Delomia L Gilliard
(74) *Attorney, Agent, or Firm* — BAYES PLLC

(57) ABSTRACT

Disclosed is an image processing method, electronic device and storage medium. The method includes obtaining feature information of first region in a current image frame, wherein first region includes a region that is determined by performing motion estimation on the current and previous image frames based on optical flow; obtaining feature information of second region in the current image frame, wherein second region includes a region corresponding to pixel points among first pixel points of the current image frame, where its association with pixel points among second pixel points of the previous image frame satisfies a condition; and based on the feature information of first region and that of second region, fusing the previous and current image frames to obtain a processed current image frame, which is used as a previous image frame for a next image frame.

20 Claims, 7 Drawing Sheets

(56) References Cited

FOREIGN PATENT DOCUMENTS

| | | | |
|---|---|---|---|
| CN | 103632352 | A | 3/2014 |
| CN | 104052990 | A | 9/2014 |
| CN | 106210449 | A | 12/2016 |
| CN | 106845552 | A | 6/2017 |
| CN | 107507225 | A | 12/2017 |
| CN | 108230245 | A | 6/2018 |
| CN | 108391060 | A | 8/2018 |
| CN | 109328454 | A | 2/2019 |
| CN | 110619652 | A | 12/2019 |
| JP | 2017200098 | A * | 11/2017 |

OTHER PUBLICATIONS

International Search Report Dated Nov. 27, 2020 from PCT Application No. PCT/CN2020/077036, 7 pages.
International Written Opinion Dated Nov. 27, 2020 from PCT Application No. PCT/CN2020/077036, 6 pages.
The supplementary European search report dated Apr. 11, 2023 from European patent application No. 20921228.1.
Amara Kahina et al, "A Combined 2D-3D Object Detection Framework", Journal of the Institution of Electronics andtelecommunication Engineers., vol. 63, No. 5, Sep. 3, 2017 (Sep. 3, 2017), pp. 607-615, XP093029997, ISSN 0377-2063.
The First Office Action dated Sep. 14, 2024 from Chinese patent application No. 202080094354.0.
Liu Bin et al, "A new algorithm for restoration and compositing of local motion blurred image", Electronic Design Engineering, Issue 12, Jun. 2013 (Jun. 20, 2013).

* cited by examiner

IMAGE PROCESSING METHOD, ELECTRONIC DEVICE AND STORAGE MEDIUM

CROSS REFERENCE TO RELATED APPLICATIONS

This application is a continuation of International Application No. PCT/CN2020/077036, filed on Feb. 27, 2020, entitled "IMAGE PROCESSING METHOD AND APPARATUS, AND DEVICE", which is incorporated herein by reference in its entirety.

BACKGROUND

The embodiments of the present application relate to electronic technology, and relate to, but are not limited to, an image processing method, electronic device and storage medium.

At present, the difficulty of multi-frame de-noising is that global motion of an image capturing module such as a camera and local motion of moving objects occur at the same time, for example, there is a moving object (such as a vehicle) that just passes through while a handheld camera is moving. It is difficult to detect the correlation between adjacent frames due to a great change in motion between two consecutive frames of the captured images in time domain. Therefore, it is difficult to accurately calculate the information of movements of objects between adjacent image frames. Furthermore, the decrease in accuracy of motion vector detection in the process of multi-frame de-noising causes poor alignment between inter frames such that ghosting, noising or blurring appears after the two frames are fused. It can be seen that in the process of capturing video images in relevant arts, when the global motion of the image capturing device and the local motion of moving objects occur at the same time, a poor effect of video multi-frame de-noising is yielded.

SUMMARY

The embodiment of the present application provides an image processing method, electronic device and storage medium.

In a first aspect, the embodiment of the present application provides an image processing method including: obtaining feature information of a first region in a current image frame, wherein the first region comprises a region that is determined in the current image frame by performing motion estimation on the current image frame and a previous image frame based on optical flow;

obtaining feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition; and obtaining a processed current image frame by fusing the previous image frame and the current image frame based on the feature information of the first region and the feature information of the second region, wherein the processed current image frame is used as a previous image frame for a next image frame for processing the next image frame.

In a second aspect, the embodiment of the present application provides an electronic device, including: one or more processors; and memory configured to store instructions which, when executed by the one or more processors, cause the one or more processors to: obtain feature information of a first region in a current image frame, wherein the first region comprises a region that is determined in the current image frame by performing motion estimation on the current image frame and a previous image frame based on optical flow;

obtain feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition; and obtain a processed current image frame by fusing the previous image frame and the current image frame based on the feature information of the first region and the feature information of the second region, wherein the processed current image frame is used as a previous image frame for a next image frame for processing the next image frame.

In a third aspect, the embodiment of the present application provides a non-transitory computer-readable storage medium having stored instructions that is executed by a processor of an electronic device, cause the processor of the electronic device to: obtain feature information of a first region in a current image frame, wherein the first region comprises a region that is determined in the current image frame by performing motion estimation on the current image frame and a previous image frame based on optical flow;

obtain feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition; and obtain a processed current image frame by fusing the previous image frame and the current image frame based on the feature information of the first region and the feature information of the second region, wherein the processed current image frame is used as a previous image frame for a next image frame for processing the next image frame.

The embodiment of the present application provides the image processing method, electronic device and storage medium, which implements: obtaining feature information of a first region in a current image frame, wherein the first region comprises a region that is determined in the current image frame by performing motion estimation on the current image frame and a previous image frame based on optical flow; obtaining feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition, in which the feature information of the first region and the feature information of the second region are used to represent the correlation between two adjacent image frames; and obtaining a processed current image frame by fusing the previous image frame and the current image frame based on the feature information of the first region and the feature information of the second region. In this way, in the fusing process, relying on the feature information of the first region and the feature information of the second region can not only accurately calculate the information of movements of objects between adjacent image frames but also improve the accuracy of inter-frame alignment, thereby avoiding ghosting appeared after the fusing. Meanwhile, the processed current image frame is used as a previous image frame for a next image frame for processing the next image frame. In this way, when global motion of an image capturing module and local motion of moving objects occur at the same time in the process of capturing video images, the problem of poor effect of video multi-frame de-noising in relevant arts is addressed, thereby improving the effect of video multi-frame de-noising and the video quality.

DETAILED DESCRIPTION

To make the objectives, technical solutions, and advantages of the embodiments of the present application more clear and specific, the technical schemes of the present application are described in further detail below with reference to the appended drawings of the embodiments of the present application. The following embodiments are used to illustrate the present application but are not intended to limit the scope of the present application.

Unless defined otherwise, all technical and scientific terms used herein have the same meaning as commonly understood by one of ordinary skill in the art to which present application belongs. Terms used in the specification of the present application herein are only for the purpose of describing specific embodiments of the present application and are not intended to limit the present application.

In the following description, reference is made to "some embodiments" which describe a subset of all possible embodiments, but it is understood that "some embodiments" may be the same subset or different subsets of all possible embodiments and may be combined with each other without conflict.

It should be noted that the terms "first", "second" and "third" referred to in the embodiments of the present application are only used for distinguishing similar objects and do not represent a specific order of the objects, and it should be understood that "first", "second" and "third" may be interchangeable in a specific sequence or a precedence sequence, so that the embodiments of the present application described herein can be implemented in an order other than that shown or described herein.

In relevant arts, motion vectors are first detected between two consecutive frames in the process of video multi-frame de-noising, where a previous frame is a de-noised image frame, and a current frame is an image frame with noise. After some processing such as image warping, the two frames are aligned to minimize the differences in motion vectors between the two frames as much as possible. Then, the two frames are fused to realize the de-noising of the current frame. However, in the process of video multi-frame de-noising, when global motion of an image capturing module and local motion of moving objects occur at the same time, for example, there is a moving object (such as a vehicle) that just passes through while a handheld image capturing module is moving, it is difficult to detect the correlation between adjacent frames due to shielding by other movements or a great change in motion or illumination between the two consecutive frames in time domain. Therefore, it is difficult to accurately calculate the information of movements of objects between adjacent frames. The decrease in accuracy of motion vector detection causes poor alignment between inter frames such that ghosting, noising or blurring appears after the two frames are fused, thereby affecting the final effect of de-noising.

Figure 1:
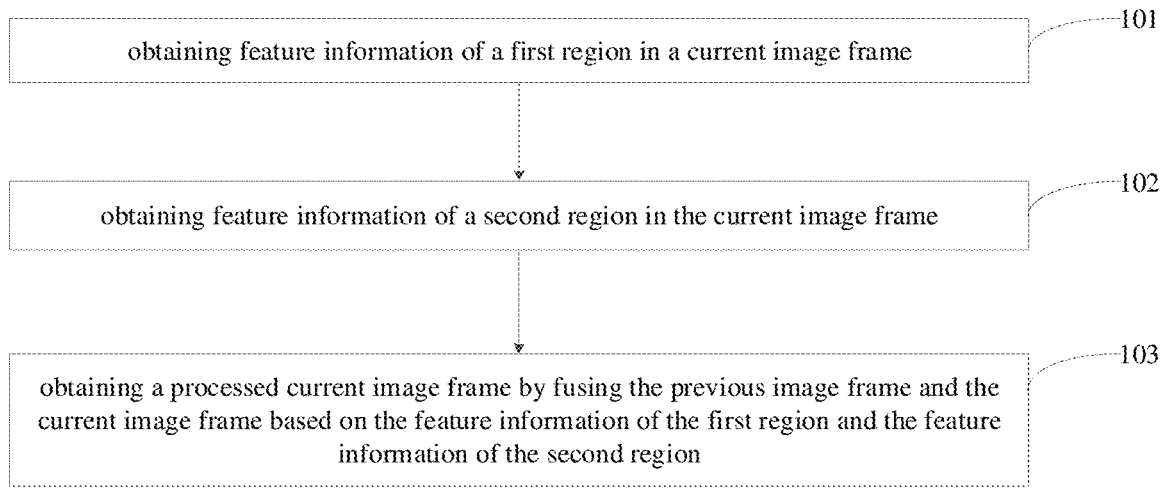
FIG. 1 is a flowchart of an image processing method provided according to an embodiment of the present application.

An embodiment of the present application provides an image processing method applied to an electronic device. Referring to FIG. 1, the method includes the following steps:

Step 101: obtaining feature information of a first region in a current image frame.

The first region comprises a region that is determined in the current image frame by performing motion estimation on the current image frame and a previous image frame based on optical flow.

In the embodiment of the present application, the electronic device may be a mobile terminal device such as a mobile phone, a tablet, a notebook, a personal digital assistant (PDA), a camera, a wearable device and the like, and may be a fixed terminal device such as a desktop computer.

In some embodiments, the electronic device may include an image capturing module and captures video images using the image capturing module. The video images include a plurality of image frames, and the plurality of image frames are processed. Of course, the electronic device may establish a communication connection with the image capturing module to obtain video images captured by the image capturing module and then process a plurality of image frames included in the video images. The feature information of the first region is used to represent the correlation between two adjacent image frames (i.e., the current image frame and the previous image frame).

Step 102: obtaining feature information of a second region in the current image frame.

The second region comprises a region corresponding to pixel points among a plurality of first pixel points of the current image frame, where association between the pixel points among the plurality of first pixel points of the current image frame and pixel points among a plurality of second pixel points of the previous image frame satisfies a condition.

The feature information of the second region is used to represent the correlation between two adjacent image frames (i.e., the current image frame and the previous image frame). There may be no overlap between the first region and the second region, or there may be an area that is partially overlapped between the first region and the second region.

Step 103: obtaining a processed current image frame by fusing the previous image frame and the current image frame based on the feature information of the first region and the feature information of the second region.

The processed current image frame is used as a previous image frame for a next image frame for processing the next image frame.

In the embodiment of the present application, after obtaining the feature information of the first region and the feature information of the second region, the electronic device can fuse the previous image frame and the current image frame based on the feature information of the first region and the feature information of the second region, i.e., the correlation between adjacent image frames, to obtain the processed current image frame.

The embodiment of the present application provides the image processing method, comprising: obtaining feature information of a first region in a current image frame, wherein the first region comprises a region that is determined in the current image frame by performing motion estimation on the current image frame and a previous image frame based on optical flow; obtaining feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition, in which the feature information of the first region and the feature information of the second region are used to represent the correlation between two adjacent image frames; and obtaining a processed current image frame by fusing the previous image frame and the current image frame based on the feature information of the first region and the feature information of the second region. In this way, in the fusing process, relying on the feature information of the first region and the feature information of the second region can not only accurately calculate the information of movements of objects between adjacent image frames but also improve the accuracy of inter-frame alignment, thereby avoiding ghosting appeared after the fusing. Meanwhile, the processed current image frame is used as a previous image frame for a next image frame for processing the next image frame. In this way, when global motion of an image capturing module and local motion of moving objects occur at the same time in the process of capturing video images, the problem of poor effect of video multi-frame de-noising in relevant arts is addressed, thereby improving the effect of video multi-frame de-noising and the video quality.

Figure 2:
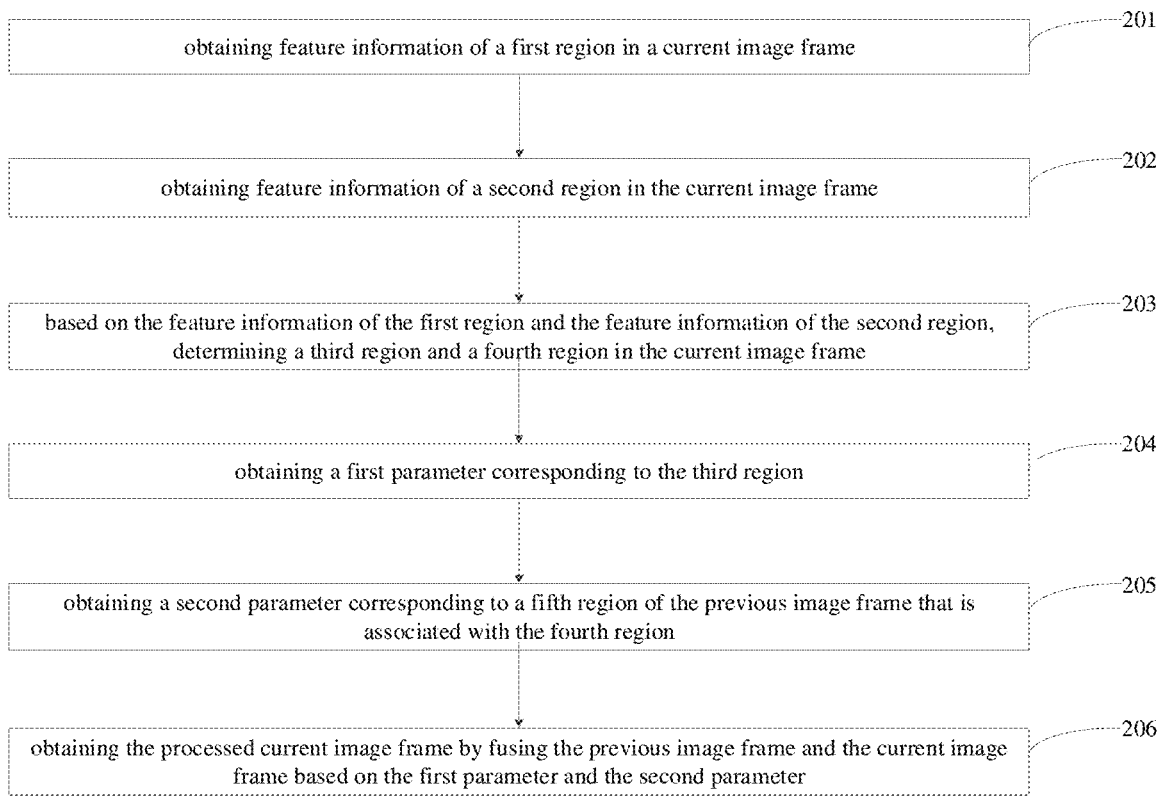
FIG. 2 is a flowchart of another image processing method provided according to an embodiment of the present application.

An embodiment of the present application provides an image processing method applied to an electronic device. Referring to FIG. 2, the method includes the following steps:

Step 201: obtaining feature information of a first region in a current image frame.

The first region comprises a region that is determined in the current image frame by performing motion estimation on the current image frame and a previous image frame based on optical flow.

Step 202: obtaining feature information of a second region in the current image frame.

The second region comprises a region corresponding to pixel points among a plurality of first pixel points of the current image frame, where association between the pixel points among the plurality of first pixel points of the current image frame and pixel points among a plurality of second pixel points of the previous image frame satisfies a condition.

In some embodiments of the present application, the feature information of the first region is used to identify the first region, and the feature information of the second region is used to identify the second region. That is, after obtaining the feature information for identifying the first region and the feature information for identifying the second region, the electronic device can de-noise on multiple frames based on these pieces of feature information to obtain high-quality images.

Step 203: based on the feature information of the first region and the feature information of the second region, determining a third region and a fourth region in the current image frame.

The third region represents a region where local motion occurs in the current image frame with respect to the previous image frame, and the fourth region represents a region where global motion occurs in the current image frame with respect to the previous image frame.

Step 204: obtaining a first parameter corresponding to the third region.

The first parameter is used to decrease the weight of the previous image frame at the time the two frames are fused, and it can also be understood as increasing the weight of the current image frame at the time the two frames are fused.

Step 205: obtaining a second parameter corresponding to a fifth region of the previous image frame that is associated with the fourth region.

The second parameter is used to increase the weight of the previous image frame at the time the two frames are fused, and it can also be understood as decreasing the weight of the current image frame at the time the two frames are fused.

Step 206: obtaining the processed current image frame by fusing the previous image frame and the current image frame based on the first parameter and the second parameter.

The processed current image frame is used as a previous image frame for a next image frame for processing the next image frame.

In some embodiments of the present application, the pixel values of the third region of a current target image frame are greater than the pixel values of the third region of the current image frame, and/or the pixel values of the fifth region of a previous target image frame are greater than the pixel values of the fifth region of the previous image frame.

Figure 3:
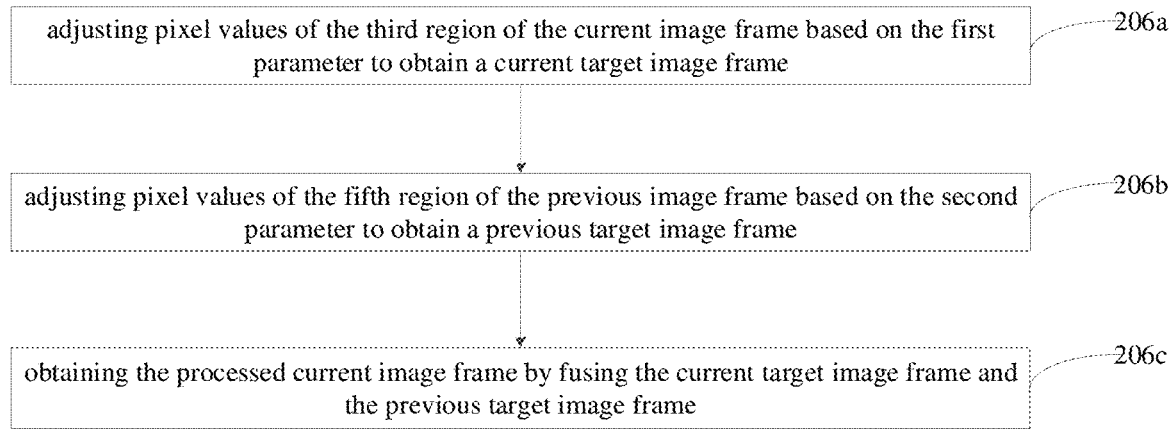
FIG. 3 is a flowchart of fusing a previous image frame and a current image frame according to an embodiment of the present application.

In an embodiment of the present application, referring to FIG. 3, the step 206 of obtaining the processed current image frame by fusing the previous image frame and the current image frame based on the first parameter and the second parameter includes the following steps:

Step 206a: adjusting pixel values of the third region of the current image frame based on the first parameter to obtain a current target image frame.

The adjusting the pixel values of the third region of the current image frame by the electronic device based on the first parameter may be to increase the pixel values of the third region of the current image frame based on the first parameter to obtain the current target image frame.

Step 206b: adjusting pixel values of the fifth region of the previous image frame based on the second parameter to obtain a previous target image frame.

The adjusting the pixel values of the fifth region of the previous image frame by the electronic device based on the second parameter may be to increase the pixel values of the fifth region of the previous image frame based on the second parameter to obtain the previous target image frame.

Step 206c: obtaining the processed current image frame by fusing the current target image frame and the previous target image frame.

The fusing the current target image frame and the previous target image frame by the electronic device may be to average any two pixel values of the pixels having a one-to-one correspondence in the current target image frame and the previous target image frame to obtain the processed current image frame.

Figure 4:
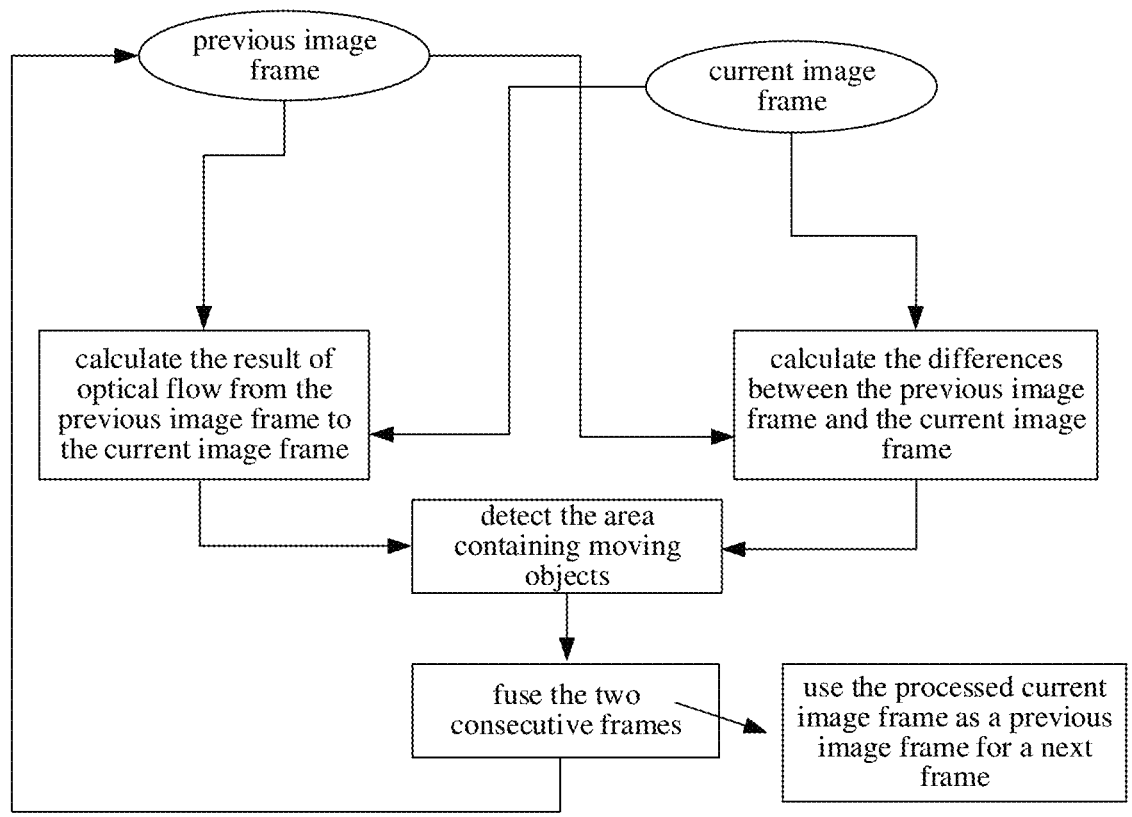
FIG. 4 is a flowchart of still another image processing method provided according to an embodiment of the present application.

Exemplarily, referring to FIG. 4, at the beginning, based on the previous image frame and the current image frame, the electronic device calculates the result of optical flow from the previous image frame to the current image frame, where the result of optical flow represents an area with optical flow. Next, based on the previous image frame and the current image frame, the electronic device calculates the differences between the previous image frame and the current image frame, where the differences indicate that an area where the absolute values of the differences are greater than a target threshold represents an area with optical flow. Then, based on the result of optical flow and the differences, the electronic device determines that the area containing moving objects in the current image frame includes the third region (that is, a local-motion region) and the fourth region (that is, a global-motion region). Further, based on the attribute characteristics of the third region and the fourth region, the electronic device fuses the previous image frame and the current image frame to obtain the processed current image frame. Finally, the electronic device uses the processed current image frame as a previous image frame for a next frame to perform multi-frame de-noising.

Figure 5:
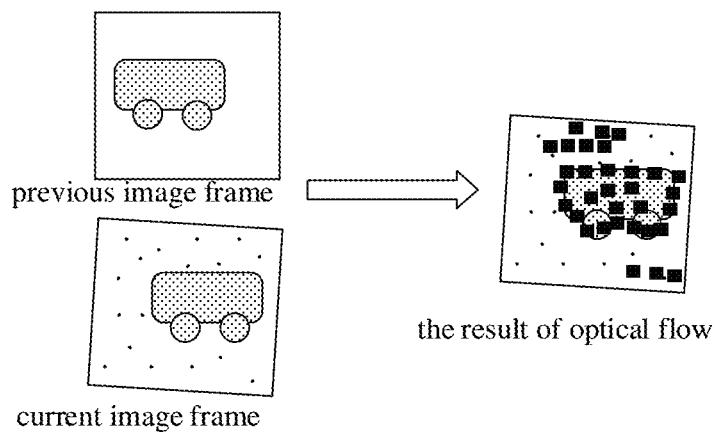
FIG. 5 is a schematic diagram exemplarily illustrating determination on feature information of a first region provided according to an embodiment of the present application.

Exemplarily, referring to FIG. 5, the result of optical flow from the previous image frame to the current image frame, calculated by the electronic device, is shown by black block regions in FIG. 5.

Figure 6:
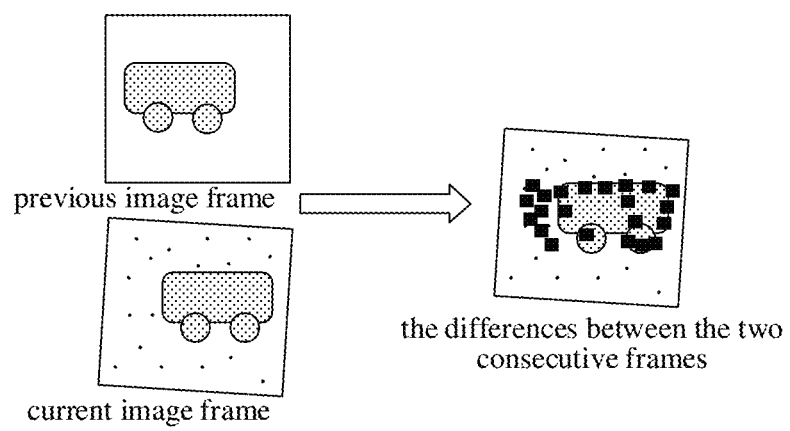
FIG. 6 is a schematic diagram exemplarily illustrating determination on feature information of a second region provided according to an embodiment of the present application.

Exemplarily, referring to FIG. 6, the differences between the previous image frame and the current image frame, calculated by the electronic device, are shown by black block regions in FIG. 6.

It can be seen from above descriptions that the image processing method provided in the embodiment of the present application uses the result of optical flow and the differences between two consecutive frames to accurately separate the local-motion region and the global-motion region. Then, according to such separation, the attribute characteristics of the local-motion region and the global-motion region are determined. For the local-motion region and the global-motion region, different parameters of de-noising are used to adjust the fusion weight of each region to eliminate the ghosting of moving objects and at the same time ensure the effect of de-noising in other areas of the background.

It should be noted that for the description of the same steps and the same content in this embodiment as those in other embodiments, reference may be made to the description of other embodiments, and details are not repeated herein.

Figure 7:
FIG. 7 is a flowchart of an image processing method provided according to another embodiment of the present application.

Based on the foregoing description, an embodiment of the present application provides an image processing method applied to an electronic device. Referring to FIG. 7, the method includes the following steps:

Step 301: downsampling the current image frame to obtain a first target image frame.

In the embodiment of the present application, the electronic device downsamples the current image frame (for example, reducing the size of the current image frame) to obtain the first target image frame so as to improve the processing speed of detection on motion area.

Step 302: downsampling the previous image frame to obtain a second target image frame.

In the embodiment of the present application, the electronic device downsamples the previous image frame (for example, reducing the size of the previous image frame) to obtain the second target image frame so as to improve the processing speed of detection on motion area.

Step 303: obtaining a first optical-flow prediction region based on optical flow from the second target image frame to the first target image frame.

Step 304: determining a region of the current image frame as the first region, where the region of the current image frame and the first optical-flow prediction region have a mapping relationship.

In this step, the electronic device determines a region of the current image frame as the first region, where the region of the current image frame and the first optical-flow prediction region have a mapping relationship. That is, the calculated result of optical flow is mapped to the current image frame.

Step 305: obtaining feature information of the first region in the current image frame.

The first region includes a region that is determined in the current image frame by performing motion estimation on the current image frame and a previous image frame based on optical flow. After the electronic device maps the calculated result of optical flow to the current image frame, it marks the blocks with optical flow so as to obtain the feature information of the first region in the current image frame.

Step 306: obtaining second absolute values of the differences between gray values of a plurality of third pixel points of the first target image frame and gray values of a plurality of fourth pixel points of the second target image frame.

Step 307: determining a region as a second optical-flow prediction region, where pixel points corresponding to the region are with the second absolute values greater than a second threshold.

Step 308: determining a region of the current image frame as the second region, where the region of the current image frame and the second optical-flow prediction region have a mapping relationship.

In this step, the electronic device determines a region of the current image frame as the second region, where the region of the current image frame and the second optical-flow prediction region have a mapping relationship. That is, the calculated differences are mapped to the current image frame.

Step 309: obtaining feature information of the second region in the current image frame.

The second region includes a region corresponding to pixel points among a plurality of first pixel points of the current image frame, where association between the pixel points among the plurality of first pixel points of the current image frame and pixel points among a plurality of second pixel points of the previous image frame satisfies a condition. After the electronic device maps the calculated differences to the current image frame, it marks the blocks with optical flow so as to obtain the feature information of the second region in the current image frame.

Step 310: obtaining a processed current image frame by fusing the previous image frame and the current image frame based on the feature information of the first region and the feature information of the second region.

The processed current image frame is used as a previous image frame for a next image frame for processing the next image frame.

It should be noted that for the description of the same steps and the same content in this embodiment as those in other embodiments, reference may be made to the description of other embodiments, and details are not repeated herein.

Figure 8:
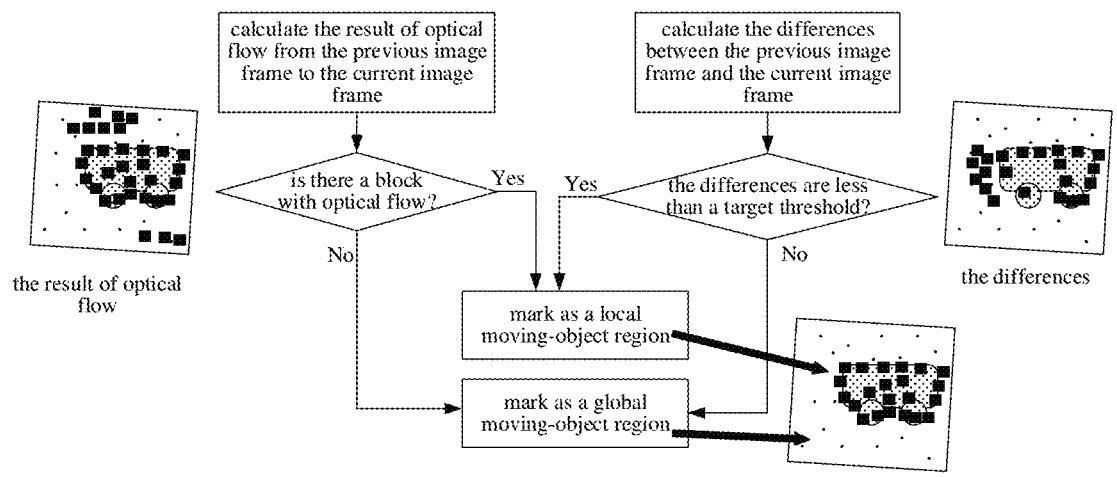
FIG. 8 is a flowchart of another image processing method provided according to another embodiment of the present application.

An embodiment of the present application provides an image processing method. Referring to FIG. 8, the method includes the following steps:

In Step 1, the electronic device calculates the result of optical flow from the previous image frame (reference image) to the current image frame (base image). In this step, in order to speed up the processing, the size of the reference image and the size of the base image are reduced first, for example, both of them are reduced by ½. Then, based on a block matching algorithm, optical flow is detected on the images with reduced size, where the block size can be 16×16.

Further, the electronic device maps the calculated result of optical flow to the base image and marks the blocks with optical flow as 0, as shown in black block areas in FIG. 5.

In this step, the electronic device may use a block-matching optical flow technique to detect optical flow of a moving object and mark the area with large motion vectors.

In Step 2, the electronic device calculates a difference between the reference image and the base image.

In this step, likewise, in order to speed up the processing, the size of the reference image and the size of the base image are reduced first. Then, calculate the absolute value of the difference between each pixel pair of the two frames of the images with reduced size. If the absolute value is less than a threshold, the pixel pair of the two frames is considered to be highly correlated. If it is greater than the threshold, it means the pixel pair of the two frames has a large difference, and it would correspond to a moving object or an area with a large change in illumination, and it is marked as 0. Further, the electronic device maps the calculated differences to the base image and marks the blocks with optical flow as 0, as shown in black block areas in FIG. 6.

In Step 3, the electronic device detects a moving-object region and a global-motion region.

In this step, the electronic device accurately detects the moving-object region based on the result of optical flow and the difference of the two frames calculated in the two afore-described steps. It should be noted that by experiments the inventor(s) knows that the result of optical flow may lead the background global-motion region to be mistakenly detected as optical flow, but the difference calculation can avoid this. Meanwhile, the difference calculation may lead the part obstructed by the moving object in the two frames to be mistakenly detected, but the result of optical flow can just cover this part. Therefore, by many experiments the inventor(s) has concluded that only the part where 0 is yielded from the two results are 0 can be a final local moving-object region.

In Step 4, the electronic device fuses the current and previous frames.

In this step, after the electronic device detects the local moving-object region and the global-motion region, different de-noising parameters are provided for different areas to adaptively adjust fusion weights to fuse the two frames.

In the embodiment of the present application, since ghosting is likely to occur in the local moving-object region, the weight of the reference image is reduced during the fusing of the two frames and the pixel values of the base image are used as much as possible so as to avoid the ghosting during the fusing. Further, in the embodiment of the present application, a smaller sigma value is provided for the region to reduce the weight of the reference image as much as possible.

On the contrary, for the global-motion region such as background, in order to ensure the effect of de-noising, the pixel values of the de-noised previous frame (reference image) will be utilized to a great extent so as to provide a larger sigma to improve the fusion weight of the reference image. In an embodiment of the present application, as an example, the parameters involved in the fusing of adjacent frames are shown in the following table:

|  | Global region | Local region |
| --- | --- | --- |
| Lambda | 0.7 | 0.7 |
| sigma | 16 | 8 |
| diffVal | 5 | 10 |
| mu | 0.9523448 | 0.457833362 |
| weight | 0.6666414 | 0.320483353 |

Exemplarily, the electronic device performs the de-noising for fusing the images, based on above parameters by using the following formulas. The de-noising filter may use a Gaussian de-noising filter, and the calculation is provided as follows:

$$diffVal = |base\_Y - ref\_Y|$$

$$mu = \exp\left(-\frac{diffVal * diffVal}{2 * sigma * sigma}\right)$$

$$weight = mu * lambda, lambda = 0.7$$

$$Base\_Y = base\_Y * (1 - weight) + ref\_Y * weight$$

The parameters involved in above table and formulas are described below. Y represents gray values, base_Y represents the gray values of the current image frame, ref Y represents the gray values of the previous image frame, diffVal represents the absolute values of the differences between the gray values of the current image frame and the gray values of the previous image frame, mu represents values of Gaussian de-noising function, sigma represents the coefficients of the Gaussian function, lambda represents the weight of the function value, weight represents the weight of the region, and Base_Y represents the gray values of the fused current image frame.

Figure 9:
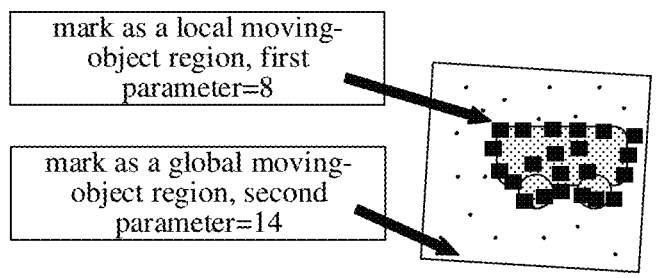
FIG. 9 is a schematic diagram exemplarily illustrating regions corresponding to a first parameter and regions corresponding to a second parameter according to an embodiment of the present application.

Exemplarily, referring to FIG. 9, for the fused image, the sigma of the local moving-object region is 8, and the sigma of the global-motion region is 14. Based on above formulas, the fused image is de-noised to obtain the processed current Image frame.

Figure 10:
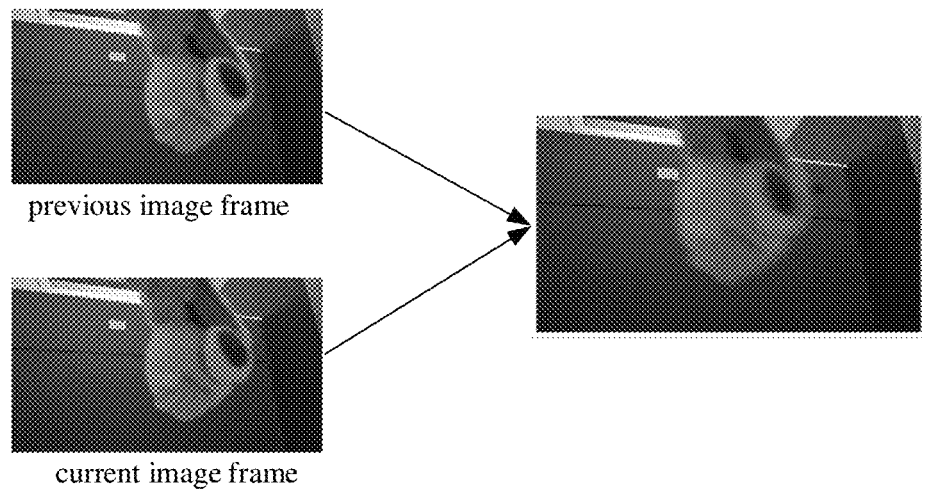
FIG. 10 is a first schematic diagram exemplarily illustrating images before and after the fusing according to an embodiment of the present application.

Exemplarily, referring to FIG. 10, the embodiment of the present application utilizes different sigma values for the de-noising for the local and global motion regions, thereby effectively eliminating the ghosting around moving objects and ensuring the effect of de-noising in the background region.

Figure 11:
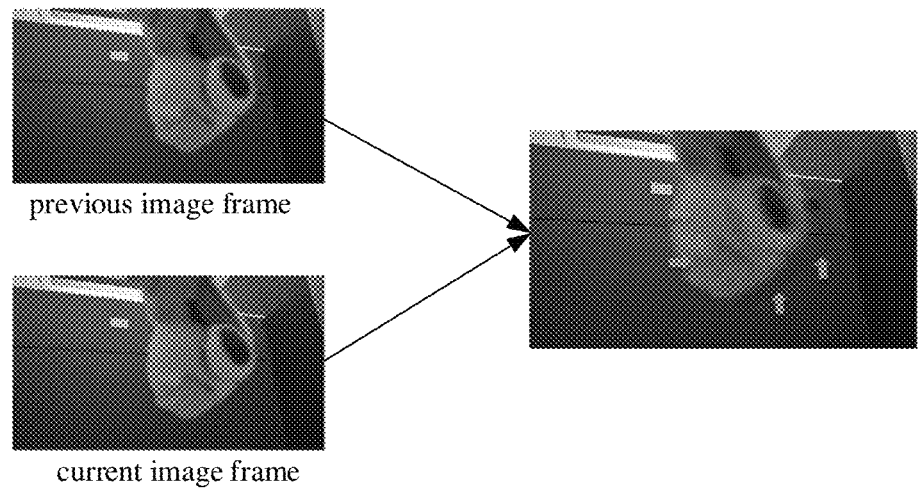
FIG. 11 is a second schematic diagram exemplarily illustrating images before and after the fusing according to an embodiment of the present application.

Exemplarily, referring to FIG. 11, in some embodiments, if the same sigma value is used for the fusing and de-noising, it will bring serious ghosting although the effect of de-noising is ensured in the region such as background. It can be seen that by de-noising using different sigma values, the processed current image frame has better image quality.

Figure 12:
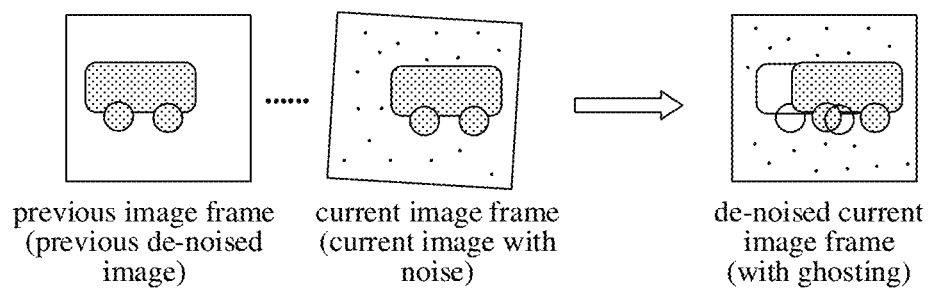
FIG. 12 is a schematic diagram illustrating that obtained by fusing adjacent frames according to an image processing method in relevant arts.

It should be noted that during video capturing, the motion of an image capturing module and the motion of moving objects often occur simultaneously, and therefore the global-motion region of a background is also included in the result of optical flow detection. In addition, in a dark scene, a great change in gray levels of the current and previous frames due to lighting condition for example will also cause the result of optical flow detection to be inaccurate. As shown in FIG. 12, a de-noised current image frame obtained by fusing the previous image frame and the current image frame using a multi-frame de-noising technique in a related art still has noise, and ghosting appears in this image.

Figure 13:
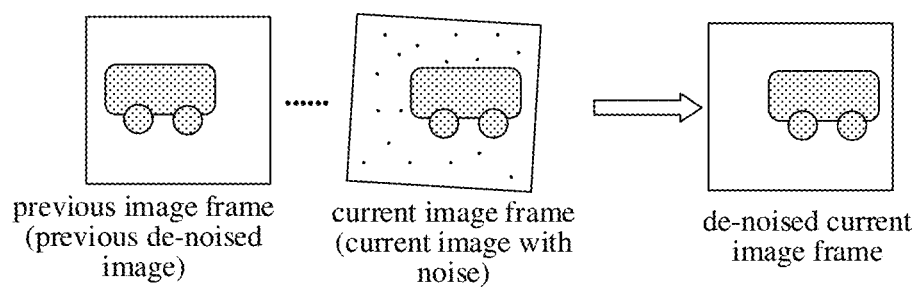
FIG. 13 is a schematic diagram illustrating that obtained by fusing adjacent frames according to an image processing method according to an embodiment of the present application.

In the image processing method provided in the embodiment of the present application, in order to obtain a more accurate result of detection of the local-motion region, the present application not only considers the result of optical flow but also considers the grayscale differences of the current and previous frames. Next, in the stage of fusing the two frames, the embodiment of the present application performs the de-noising by using different sigma values for the separated moving-object region and global-motion region. As shown in FIG. 13, the image processing method provided in the present application is adopted to fuse the previous image frame and the current image frame, avoiding the ghosting appeared on moving objects by adjusting the fusion weights of the moving-object region and the global-motion region and ensuring the effect of de-noising on the global-motion region of the background.

The embodiment of the present application can yield the following beneficial effects. The result of optical flow detection and the differences between the gray values of the current and previous frames are used to accurately separate the local-motion region and the global-motion region. Then, according to such separation, for the local-motion region and the global-motion region, different parameters of de-noising are used to adjust the fusion weight of each region to eliminate the ghosting of moving objects and at the same time ensure the effect of de-noising in other areas of the background.

An embodiment of the present application provides an image processing apparatus. Various modules included in the apparatus can be implemented by a processor in an electronic device. Of course, it can also be implemented by specific logic circuits. In an embodiment, the processor can be a central processing unit (CPU), a microprocessor (MPU), a digital signal processor (DSP), a field programmable gate array (FPGA), or the like.

Figure 14:
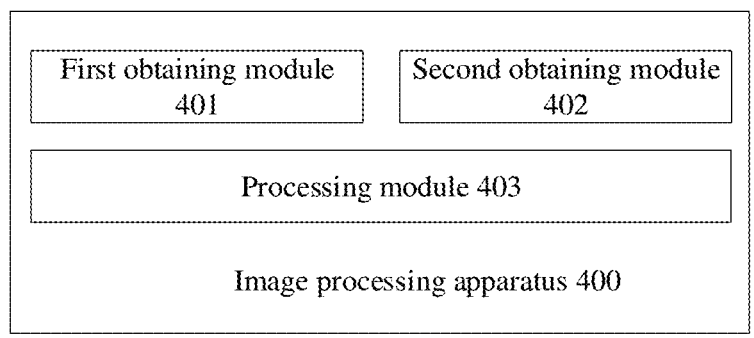
FIG. 14 is a schematic diagram illustrating the structure of an image processing apparatus provided according to an embodiment of the present application.

FIG. 14 is a schematic diagram illustrating the structure of an image processing apparatus according to an embodiment of the present application. As shown in FIG. 14, the image processing apparatus 400 includes a first obtaining module 401, a second obtaining module 402 and a processing module 403, in which:

The first obtaining module 401 is configured for obtaining feature information of a first region in a current image frame, wherein the first region includes a region that is determined in the current image frame by performing motion estimation on the current image frame and a previous image frame based on optical flow;

The second obtaining module 402 is configured for obtaining feature information of a second region in the current image frame, wherein the second region includes a region corresponding to pixel points among a plurality of first pixel points of the current image frame, where association between the pixel points among the plurality of first pixel points of the current image frame and pixel points among a plurality of second pixel points of the previous image frame satisfies a condition; and The processing module 403 is configured for obtaining a processed current image frame by fusing the previous image frame and the current image frame based on the feature information of the first region and the feature information of the second region, wherein the processed current image frame is used as a previous image frame for a next image frame for processing the next image frame.

In other embodiments of the present application, the processing module 403 is configured for: based on the feature information of the first region and the feature information of the second region, determining a third region and a fourth region in the current image frame, wherein the third region represents a region where local motion occurs in the current image frame with respect to the previous image frame, and the fourth region represents a region where global motion occurs in the current image frame with respect to the previous image frame;

obtaining a first parameter corresponding to the third region;

obtaining a second parameter corresponding to a fifth region of the previous image frame that is associated with the fourth region; and obtaining the processed current image frame by fusing the previous image frame and the current image frame based on the first parameter and the second parameter.

In other embodiments of the present application, the processing module 403 is configured for: adjusting pixel values of the third region of the current image frame based on the first parameter to obtain a current target image frame;

adjusting pixel values of the fifth region of the previous image frame based on the second parameter to obtain a previous target image frame; and obtaining the processed current image frame by fusing the current target image frame and the previous target image frame.

In other embodiments of the present application, the pixel values of the third region of the current target image frame are greater than the pixel values of the third region of the current image frame, and/or the pixel values of the fifth region of the previous target image frame are greater than the pixel values of the fifth region of the previous image frame.

In other embodiments of the present application, the processing module 403 is configured for: downsampling the current image frame to obtain a first target image frame;

downsampling the previous image frame to obtain a second target image frame;

obtaining a first optical-flow prediction region based on optical flow from the second target image frame to the first target image frame; and determining a region of the current image frame as the first region, where the region of the current image frame and the first optical-flow prediction region have a mapping relationship.

In other embodiments of the present application, the association satisfying the condition represents that first absolute values of the differences between gray values of the first pixel points and the gray values of the second pixel points are greater than a first threshold.

In other embodiments of the present application, the processing module 403 is configured for: downsampling the current image frame to obtain a first target image frame;

downsampling the previous image frame to obtain a second target image frame;

obtaining second absolute values of the differences between gray values of a plurality of third pixel points of the first target image frame and gray values of a plurality of fourth pixel points of the second target image frame;

determining a region as a second optical-flow prediction region, where pixel points corresponding to the region are with the second absolute values greater than a second threshold; and determining a region of the current image frame as the second region, where the region of the current image frame and the second optical-flow prediction region have a mapping relationship.

In other embodiments of the present application, the feature information of the first region is used to identify the first region, and the feature information of the second region is used to identify the second region.

The embodiment of the present application provides the image processing apparatus that implements: obtaining feature information of a first region in a current image frame, wherein the first region includes a region that is determined in the current image frame by performing motion estimation on the current image frame and a previous image frame based on optical flow; obtaining feature information of a second region in the current image frame, wherein the second region includes a region corresponding to pixel points among a plurality of first pixel points of the current image frame, where association between the pixel points among the plurality of first pixel points of the current image frame and pixel points among a plurality of second pixel points of the previous image frame satisfies a condition, in which the feature information of the first region and the feature information of the second region are used to represent the correlation between two adjacent image frames; and obtaining a processed current image frame by fusing the previous image frame and the current image frame based on the feature information of the first region and the feature information of the second region.

In this way, in the fusing process, relying on the feature information of the first region and the feature information of the second region can not only accurately calculate the information of movements of objects between adjacent image frames but also improve the accuracy of inter-frame alignment, thereby avoiding ghosting appeared after the fusing.

Meanwhile, the processed current image frame is used as a previous image frame for a next image frame for processing the next image frame. In this way, when global motion of an image capturing module and local motion of moving objects occur at the same time in the process of capturing video images, the problem of poor effect of video multi-frame de-noising in relevant arts is addressed, thereby improving the effect of video multi-frame de-noising and the video quality.

The description of above apparatus embodiment is similar to the description of above method embodiment, having beneficial effects similar to the method embodiment. For technical details not disclosed in the apparatus embodiment of the present application, please refer to the description of the method embodiment of the present application for the purpose of understanding.

It should be noted that, in the embodiments of this application, if the above image processing methods are implemented as software functional units and sold or used as standalone products, they may be stored in a computer readable storage medium.

Based on such understanding, the essential technical solution, or the portion that contributes to the related art, or all or part of the technical solution of the embodiments of this application may be embodied as software products.

The computer software product is stored in a storage medium and includes several instructions to cause an electronic device (which may be a mobile phone, a tablet computer, a desktop computer, a server, a television, an audio player, etc.) to execute some or all steps of the methods described in various embodiments.

The above storage medium may include various kinds of media that can store program codes, such as a universal serial bus (USB) flash disk, a mobile hard drive, a read only memory (ROM), a magnetic disk, or an optical disk. As such, the embodiments of this application are not limited to any specific combination of hardware and software.

Figure 15:
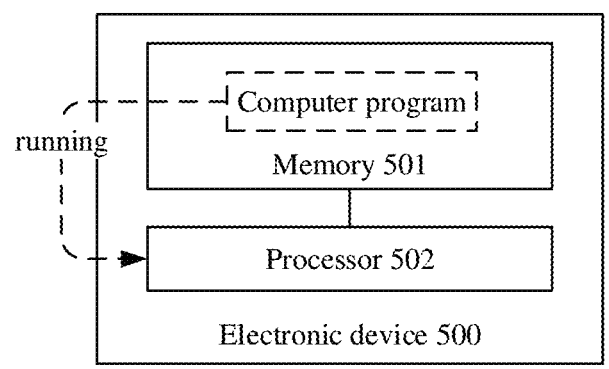
FIG. 15 is a schematic diagram illustrating a hardware entity of an electronic device provided according to an embodiment of the present application.

Accordingly, embodiments of this application provide an electronic device. FIG. 15 is a schematic diagram of a hardware entity of an electronic device provided in embodiments of this application. As illustrated in FIG. 15, the electronic device 500 includes a memory 501 and a processor 502. The memory 501 stores a computer program executable on the processor 502, and the processor 502 executes the program to implement steps in the image processing method provided in the above embodiments.

It should be noted that, the memory 501 is configured to store instructions and applications executable by the processor 502, and further to cache data to be processed or processed (for example, image data, audio data, voice communication data, and video communication data) by the processor 502 and various modules in the electronic device 500, which can be implemented through FLASH or random access memory (RAM).

Accordingly, embodiments of this application provide a computer-readable storage medium. The computer-readable storage medium stores a computer program thereon. When executed by a processor, the computer program implements steps in the image processing method provided in the above embodiments.

Herein, it should be noted that: the descriptions of the above storage medium and device embodiments are similar to the descriptions of the above method embodiments, and the above storage medium and device embodiments have similar advantageous effects to the method embodiments. For technical details not disclosed in the storage medium and device embodiments of this application, please refer to the descriptions of the method embodiments of this application for the purpose of understanding.

It is to be understood that "one embodiment" or "an embodiment" throughout the specification means that a particular feature, structure, or characteristic associated with the embodiment is included in at least one embodiment of this application. Thus, "in one embodiment" or "in an embodiment" appearing in various places throughout the specification does not necessarily refer to the same embodiment.

Furthermore, the particular features, structures, or characteristics may be combined in any suitable manner in one or more embodiments. It should be understood that, in various embodiments of this application, the magnitude of the sequence numbers of the above processes does not mean the order of execution.

The order of execution of each process should be determined by its function and internal logic and should not constitute any limitation to the implementation process of the embodiments of this application. The serial numbers of the foregoing embodiments of this application are only for description, and do not represent the superiority of the embodiments of this application.

It is noted that in this application, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including one . . . " does not exclude the existence of other same elements in the process, method, article, or device that includes the element.

In some embodiments of this application, it should be understood that the device/apparatus and method disclosed in embodiments provided herein may be implemented in other manners. For example, the device embodiments described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of this application may be integrated into one processing unit, or each unit may be physically present, or two or more units may be integrated into one unit. The above-mentioned integrated unit can be implemented in the form of hardware or a software function unit, or combination thereof It will be understood by those of ordinary skill in the art that, all or a part of the various methods of the embodiments described above may be accomplished by means of a program to instruct associated hardware. The program may be stored in a computer readable storage medium. When executed, the program executes steps including the above method embodiments. The aforementioned storage medium includes: a mobile storage device, an ROM, a magnetic disk or an optical disk and other mediums that can store program codes.

Alternatively, the integrated unit may be stored in a computer readable storage when it is implemented in the form of a software functional unit and is sold or used as a separate product. Based on such understanding, the technical solutions of this application essentially, or the part of the technical solutions that contributes to the related art, or all or part of the technical solutions, may be embodied in the form of a software product.

The computer software product is stored in a memory and includes instructions for causing a computer device (which may be a cell phone, tablet, desktop, server, television, audio player, etc.) to perform all or part of the steps described in the various embodiments of this application. The aforementioned storage medium includes: a mobile storage device, an ROM, a magnetic disk or an optical disk and other mediums that can store program codes.

The methods disclosed in the several method embodiments of this application can be combined without conflict to obtain new method embodiments.

The features disclosed in the several product embodiments of this application can be combined without conflict to obtain new product embodiments.

The features disclosed in the several method embodiments or device embodiments of this application can be combined without conflict to obtain new method embodiments or device embodiments.

The above are some embodiments of this application, but the protection scope of this application is not limited thereto. Any changes or substitutions that can be easily conceived by those skilled in the art within the technical scope disclosed by this application should be covered by the protection scope of this application. Therefore, the protection scope of this application should be subject to the protection scope of the claims.

The embodiment of the present application provides the image processing method, electronic device and storage medium, which implements: obtaining feature information of a first region in a current image frame, wherein the first region includes a region that is determined in the current image frame by performing motion estimation on the current image frame and a previous image frame based on optical flow; obtaining feature information of a second region in the current image frame, wherein the second region includes a region corresponding to pixel points among a plurality of first pixel points of the current image frame, where association between the pixel points among the plurality of first pixel points of the current image frame and pixel points among a plurality of second pixel points of the previous image frame satisfies a condition, in which the feature information of the first region and the feature information of the second region are used to represent the correlation between two adjacent image frames; and obtaining a processed current image frame by fusing the previous image frame and the current image frame based on the feature information of the first region and the feature information of the second region.

In this way, in the fusing process, relying on the feature information of the first region and the feature information of the second region can not only accurately calculate the information of movements of objects between adjacent image frames but also improve the accuracy of inter-frame alignment, thereby avoiding ghosting appeared after the fusing.

Meanwhile, the processed current image frame is used as a previous image frame for a next image frame for processing the next image frame.

In this way, when global motion of an image capturing module and local motion of moving objects occur at the same time in the process of capturing video images, the problem of poor effect of video multi-frame de-noising in relevant arts is addressed, thereby improving the effect of video multi-frame de-noising and the video quality.

What is claimed is:

1. An image processing method, comprising:
   obtaining feature information of a first region in a current image frame, wherein the first region comprises a region that is determined in the current image frame by performing motion estimation on the current image frame and a previous image frame based on optical flow;
   obtaining feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition; and
   obtaining a processed current image frame by fusing the previous image frame and the current image frame based on the feature information of the first region and the feature information of the second region, wherein the processed current image frame is used as a previous image frame for a next image frame for processing the next image frame,
   wherein the obtaining the processed current image frame by fusing the previous image frame and the current image frame based on the feature information of the first region and the feature information of the second region comprises:
   based on the feature information of the first region and the feature information of the second region, determining a third region and a fourth region in the current image frame, wherein the third region represents a region where local motion occurs in the current image frame with respect to the previous image frame, and the fourth region represents a region where global motion occurs in the current image frame with respect to the previous image frame; and
   based on the third region and the fourth region, processing the fusing between the previous image frame and the current image frame.

2. The method of claim 1, wherein the obtaining the processed current image frame by fusing the previous image frame and the current image frame based on the feature information of the first region and the feature information of the second region comprises:
   obtaining a first parameter corresponding to the third region;
   obtaining a second parameter corresponding to a fifth region of the previous image frame that is associated with the fourth region; and
   obtaining the processed current image frame by fusing the previous image frame and the current image frame based on the first parameter and the second parameter.

3. The method of claim 2, wherein the obtaining the processed current image frame by fusing the previous image frame and the current image frame based on the first parameter and the second parameter comprises:
   adjusting pixel values of the third region of the current image frame based on the first parameter to obtain a current target image frame;
   adjusting pixel values of the fifth region of the previous image frame based on the second parameter to obtain a previous target image frame; and
   obtain the processed current image frame by fusing the current target image frame and the previous target image frame.

4. The method of claim 3, wherein the pixel values of the third region of the current target image frame are greater than the pixel values of the third region of the current image frame, and/or the pixel values of the fifth region of the previous target image frame are greater than the pixel values of the fifth region of the previous image frame.

5. The method of claim 1, further comprising:
   downsampling the current image frame to obtain a first target image frame;
   downsampling the previous image frame to obtain a second target image frame;
   obtaining a first optical-flow prediction region based on optical flow from the second target image frame to the first target image frame; and
   determining a region of the current image frame as the first region, where the region of the current image frame and the first optical-flow prediction region have a mapping relationship.

6. The method of claim 1, wherein the association satisfying the condition represents that first absolute values of the differences between gray values of the first pixel points and the gray values of the second pixel points are greater than a first threshold.

7. The method of claim 1, further comprising:
   downsampling the current image frame to obtain a first target image frame;
   downsampling the previous image frame to obtain a second target image frame;
   obtaining second absolute values of the differences between gray values of a plurality of third pixel points of the first target image frame and gray values of a plurality of fourth pixel points of the second target image frame;
   determining a region as a second optical-flow prediction region, where pixel points corresponding to the region are with the second absolute values greater than a second threshold; and
   determining a region of the current image frame as the second region, where the region of the current image frame and the second optical-flow prediction region have a mapping relationship.

8. The method of claim 1, wherein the feature information of the first region is used to identify the first region, and the feature information of the second region is used to identify the second region.

9. An electronic device, comprising:
   one or more processors; and
   memory configured to store instructions which, when executed by the one or more processors, cause the one or more processors to:

obtain feature information of a first region in a current image frame, wherein the first region comprises a region that is determined in the current image frame by performing motion estimation on the current image frame and a previous image frame based on optical flow;

obtain feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition; and obtain a processed current image frame by fusing the previous image frame and the current image frame based on the feature information of the first region and the feature information of the second region, wherein the processed current image frame is used as a previous image frame for a next image frame for processing the next image frame, wherein the one or more processor is configured to:

based on the feature information of the first region and the feature information of the second region, determine a third region and a fourth region in the current image frame, wherein the third region represents a region where local motion occurs in the current image frame with respect to the previous image frame, and the fourth region represents a region where global motion occurs in the current image frame with respect to the previous image frame; and based on the third region and the fourth region, process the fusing between the previous image frame and the current image frame.

10. The electronic device of claim 9, wherein the one or more processor is configured to:
obtain a first parameter corresponding to the third region;
obtain a second parameter corresponding to a fifth region of the previous image frame that is associated with the fourth region; and
obtain the processed current image frame by fusing the previous image frame and the current image frame based on the first parameter and the second parameter.

11. The electronic device of claim 10, wherein the one or more processor is configured to:
adjust pixel values of the third region of the current image frame based on the first parameter to obtain a current target image frame;
adjust pixel values of the fifth region of the previous image frame based on the second parameter to obtain a previous target image frame; and
obtain the processed current image frame by fusing the current target image frame and the previous target image frame.

12. The electronic device of claim 11, wherein the pixel values of the third region of the current target image frame are greater than the pixel values of the third region of the current image frame, and/or the pixel values of the fifth region of the previous target image frame are greater than the pixel values of the fifth region of the previous image frame.

13. The electronic device of claim 9, wherein the one or more processor is configured to:
downsample the current image frame to obtain a first target image frame;
downsample the previous image frame to obtain a second target image frame;
obtain a first optical-flow prediction region based on optical flow from the second target image frame to the first target image frame; and
determine a region of the current image frame as the first region, where the region of the current image frame and the first optical-flow prediction region have a mapping relationship.

14. The electronic device of claim 9, wherein the association satisfying the condition represents that first absolute values of the differences between gray values of the first pixel points and the gray values of the second pixel points are greater than a first threshold.

15. The electronic device of claim 9, wherein the one or more processor is configured to:
downsample the current image frame to obtain a first target image frame;
downsample the previous image frame to obtain a second target image frame;
obtain second absolute values of the differences between gray values of a plurality of third pixel points of the first target image frame and gray values of a plurality of fourth pixel points of the second target image frame;
determine a region as a second optical-flow prediction region, where pixel points corresponding to the region are with the second absolute values greater than a second threshold; and
determine a region of the current image frame as the second region, where the region of the current image frame and the second optical-flow prediction region have a mapping relationship.

16. The electronic device of claim 9, wherein the feature information of the first region is used to identify the first region, and the feature information of the second region is used to identify the second region.

17. A non-transitory computer-readable storage medium having stored instructions that is executed by a processor of an electronic device, cause the processor of the electronic device to:
obtain feature information of a first region in a current image frame, wherein the first region comprises a region that is determined in the current image frame by performing motion estimation on the current image frame and a previous image frame based on optical flow;

obtain feature information of a second region in the current image frame, wherein the second region comprises a region corresponding to pixel points among a plurality of first pixel points of the current image frame, where association between the pixel points among the plurality of first pixel points of the current image frame and pixel points among a plurality of second pixel points of the previous image frame satisfies a condition; and obtain a processed current image frame by fusing the previous image frame and the current image frame based on the feature information of the first region and the feature information of the second region, wherein the processed current image frame is used as a previous image frame for a next image frame for processing the next image frame, wherein when executed, the instructions cause the processor of the electronic device to:
based on the feature information of the first region and the feature information of the second region, determine a third region and a fourth region in the current image frame, wherein the third region represents a region where local motion occurs in the current image frame with respect to the previous image frame, and the fourth region represents a region where global motion occurs in the current image frame with respect to the previous image frame; and based on the third region and the fourth region, process the fusing between the previous image frame and the current image frame.

18. The non-transitory computer-readable storage medium of claim 17, wherein when executed, the instructions cause the processor of the electronic device to:

obtain a first parameter corresponding to the third region;

obtain a second parameter corresponding to a fifth region of the previous image frame that is associated with the fourth region; and obtain the processed current image frame by fusing the previous image frame and the current image frame based on the first parameter and the second parameter.

19. The non-transitory computer-readable storage medium of claim 18, wherein when executed, the instructions cause the processor of the electronic device to:

adjust pixel values of the third region of the current image frame based on the first parameter to obtain a current target image frame;

adjust pixel values of the fifth region of the previous image frame based on the second parameter to obtain a previous target image frame; and obtain the processed current image frame by fusing the current target image frame and the previous target image frame.

20. The non-transitory computer-readable storage medium of claim 19, wherein the pixel values of the third region of the current target image frame are greater than the pixel values of the third region of the current image frame, and/or the pixel values of the fifth region of the previous target image frame are greater than the pixel values of the fifth region of the previous image frame.

\* \* \* \* \*